(12) United States Patent
Wang et al.

(10) Patent No.: US 12,455,944 B2
(45) Date of Patent: Oct. 28, 2025

(54) METHOD, ELECTRONIC DEVICE, AND COMPUTER PROGRAM PRODUCT FOR ANALYZING SAMPLES

(71) Applicant: EMC IP Holding Company LLC, Hopkinton, MA (US)

(72) Inventors: Zijia Wang, WeiFang (CN); Jiacheng Ni, Shanghai (CN); Zhen Jia, Shanghai (CN); Wenbin Yang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 979 days.

(21) Appl. No.: 17/492,853

(22) Filed: Oct. 4, 2021

(65) Prior Publication Data

US 2023/0064850 A1    Mar. 2, 2023

(30) Foreign Application Priority Data

Aug. 31, 2021   (CN) .......................... 202111011011.6

(51) Int. Cl.
*G06F 18/2413*    (2023.01)
*G06F 18/2132*    (2023.01)
(Continued)

(52) U.S. Cl.
CPC .... *G06F 18/2413* (2023.01); *G06F 18/21322* (2023.01); *G06F 18/22* (2023.01); *G06F 18/21328* (2023.01); *G06N 20/00* (2019.01)

(58) Field of Classification Search
CPC .......... G06F 18/2413; G06F 18/21322; G06F 18/22; G06F 18/21328; G06N 20/00; G06V 10/7715
See application file for complete search history.

(56) References Cited

U.S. PATENT DOCUMENTS

2019/0392248 A1* 12/2019 Zhang .................. G06V 10/761
2020/0234442 A1*  7/2020 Barnes ................ G01N 33/574
(Continued)

OTHER PUBLICATIONS

H. Song et al., "Distribution Calibration for Regression," International Conference on Machine Learning, 2019, 10 pages.
(Continued)

*Primary Examiner* — Markus A. Vasquez
(74) *Attorney, Agent, or Firm* — Ryan, Mason & Lewis, LLP

(57) ABSTRACT

Embodiments of the present disclosure provide a method, an electronic device, and a computer program product for analyzing samples. The method includes acquiring a set of feature representations associated with a set of samples. The set of samples illustratively have classification information for indicating classifications of the set of samples. The method further includes adjusting the set of feature representations so that distances between feature representations of samples corresponding to the same classification are less than a first distance threshold. The method further includes training a classification model based on the adjusted set of feature representations and the classification information. The classification model is illustratively configured to receive an input sample and determine a classification of the input sample. In this manner, a relatively accurate classification model can be trained using a small number of samples, thereby reducing computation time and required computation capacity.

19 Claims, 6 Drawing Sheets

(51) Int. Cl.
  *G06F 18/22* (2023.01)
  *G06N 20/00* (2019.01)

(56) References Cited

U.S. PATENT DOCUMENTS

2021/0004589 A1* 1/2021 Turkelson ........ G06V 30/19173
2022/0284303 A1* 9/2022 Faubert ................. G06N 3/006
2024/0054552 A1* 2/2024 Fu ...................... G06Q 30/0641

OTHER PUBLICATIONS

M. Rueda et al., "Estimation of the Distribution Function with Calibration Methods," Journal of Statistical Planning and Inference, vol. 137, 2007 pp. 435-448.
S. Yang et al., "Free Lunch for Few-shot Learning: Distribution Calibration," arXiv:2101.06395v2, Mar. 15, 2021, 13 pages.
O. Vinyals et al., "Matching Networks for One Shot Learning," arXiv:1606.04080v2, Dec. 29, 2017, 12 pages.
S. Ravi et al., "Optimization as a Model for Few-Shot Learning," Published as a conference paper at ICLR 2017, 11 pages.
P. Welinder et al., "Caltech-UCSD Birds 200," http://www.vision.caltech.edu/visipedia/CUB-200.html, 2010, 2 pages.
J. W. Tukey, "Exploratory Data Analysis," Addison-Wesley Publishing Company, 1977, 711 pages.
O. Russakovsky et al., "ImageNet Large Scale Visual Recognition Challenge," arXiv:1409.0575v3, Jan. 30, 2015, 43 pages.
W.-Y. Chen et al., "A Closer Look at Few-Shot Classification," arXiv:1904.04232v2, Jan. 12, 2020, 17 pages.
A. A. Rusu et al., "Meta-Learning with Latent Embedding Optimization," arXiv:1807.05960v3, Mar. 26, 2019, 17 pages.
B. Liu et al., "Negative Margin Matters: Understanding Margin in Few-shot Classification," arXiv:2003.12060v1, Mar. 26, 2020, 21 pages.
Z. Chen et al., "Multi-level Semantic Feature Augmentation for One-shot Learning," arXiv:1804.05298v4, Mar. 14, 2019, 12 pages.
Y. Liu et al., "An Ensemble of Epoch-wise Empirical Bayes for Few-shot Learning," arXiv:1904.08479v6, Jul. 17, 2020, 25 pages.
P. Mangla et al., "Charting the Right Manifold: Manifold Mixup for Few-shot Learning," arXiv:1907.12087v4, Jan. 18, 2020, 12 pages.
T. Wang et al., "Dataset Distillation," arXiv:1811.10959v3, Feb. 24, 2020, 14 pages.
I. Sucholutsky et al., "Improving Dataset Distillation," arXiv:1910.02551v1, Oct. 6, 2019, 19 pages.
Y. Xian et al. "Feature Generating Networks for Zero-Shot Learning," arXiv:1712.00981v2, Apr. 12, 2018, 10 pages.
R. Salakhutdinov et al. "One-Shot Learning with a Hierarchical Nonparametric Bayesian Model," Workshop on Unsupervised and Transfer Learning, vol. 27, 2012, pp. 195-207.
D. Zhabinskaya et al., "Force and Potential Energy," https://phys.libretexts.org/Under_Construction/Purgatory/2%3A_Applying_Models_to_Mechanical_Phenomena/2.5%3A_Force_and_Potential_Energy, Jun. 2019, 5 pages.
L. E. Peterson, "K-nearest Neighbor," http://www.scholarpedia.org/article/K-nearest_neighbor, Scholarpedia, vol. 4, No. 2, 2009, 12 pages.
E. A. Wan et al., "The Unscented Kalman Filter for Nonlinear Estimation," Proceedings of the IEEE 2000 Adaptive Systems for Signal Processing, Communications, and Control Symposium, 2000, 6 pages.
E. A. Wan et al., "The Unscented Kalman Filter," Kalman Filtering and Neural Networks, Chapter 7, 2001, 50 pages.
I. Radosavovic et al., "Data Distillation: Towards Omni-Supervised Learning," IEEE/CVF Conference on Computer Vision and Pattern Recognition, Jun. 18-23, 2018, 10 pages.
Wikipedia, "Knowledge Distillation," https://en.wikipedia.org/wiki/Knowledge_distillation, Mar. 30, 2021, 4 pages.
U.S. Appl. No. 17/318,568 filed in the name of Zijia Wang et al. May 12, 2021, and entitled "Method, Electronic Device, and Computer Program Product for Data Distillation."
U.S. Appl. No. 17/397,518 filed in the name of Zijia Wang et al. Aug. 9, 2021, and entitled "Method, Electronic Device, and Computer Program Product for Data Processing."
U.S. Appl. No. 17/404,011 filed in the name of Zijia Wang et al. Aug. 17, 2021, and entitled "Method, Electronic Device, and Computer Program Product for Sample Management."

* cited by examiner

METHOD, ELECTRONIC DEVICE, AND COMPUTER PROGRAM PRODUCT FOR ANALYZING SAMPLES

RELATED APPLICATION(S)

The present application claims priority to Chinese Patent Application No. 202111011011.6, filed Aug. 31, 2021, and entitled "Method, Electronic Device, and Computer Program Product for Analyzing Samples," which is incorporated by reference herein in its entirety.

FIELD

Embodiments of the present disclosure relate to the field of computers, and more particularly, to a method, an electronic device, and a computer program product for analyzing samples.

BACKGROUND

When performing machine learning, a large number of samples are used for training. Because collecting and annotating a large number of training samples will lead to high cost, training from a limited number of training samples has attracted more and more attention. Machine learning that uses a small number of samples for training is also referred to as Few-Shot Learning. In this regard, two research directions are known, one of which is to study a training model so that the model can be suitable for training using a small number of samples; and the other one is to study the processing of a small number of samples in a training set to improve the generalization performance of the samples.

SUMMARY

Embodiments of the present disclosure provide a solution for analyzing samples.

In a first aspect of the present disclosure, a method for analyzing samples is provided, including: acquiring a set of feature representations associated with a set of samples, wherein the set of samples have classification information for indicating classifications of the set of samples. The method further includes adjusting the set of feature representations so that distances between feature representations of samples corresponding to the same classification are less than a first distance threshold. The method further includes training a classification model based on the adjusted set of feature representations and the classification information. The classification model is configured to receive an input sample and determine a classification of the input sample.

In a second aspect of the present disclosure, a method for analyzing samples is provided, including: acquiring an input sample. The method further includes processing the input sample using a classification model, so as to determine a classification of the input sample. The classification model is trained based on the method of the first aspect of the present disclosure.

In a third aspect of the present disclosure, an electronic device is provided. The electronic device includes a processor and a memory coupled to the processor, the memory having instructions stored therein that, when executed by the processor, cause the device to execute actions including: acquiring a set of feature representations associated with a set of samples, wherein the set of samples have classification information for indicating classifications of the set of samples. The actions further include adjusting the set of feature representations so that distances between feature representations of samples corresponding to the same classification are less than a first distance threshold. The actions further include training a classification model based on the adjusted set of feature representations and the classification information, wherein the classification model is configured to receive an input sample and determine a classification of the input sample.

In a fourth aspect of the present disclosure, an electronic device is provided. The electronic device includes a processor and a memory coupled to the processor, the memory having instructions stored therein that, when executed by the processor, cause the device to execute actions including: acquiring an input sample. The actions further include processing the input sample using a classification model, so as to determine a classification of the input sample, wherein the classification model is trained based on the method of the first aspect of the present disclosure.

In a fifth aspect of the present disclosure, a computer program product is provided. The computer program product is tangibly stored on a computer-readable medium and includes machine-executable instructions that, when executed, cause a machine to perform the method according to the first aspect and/or the second aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent from additional description provided herein of example embodiments of the present disclosure, with reference to the accompanying drawings. In the example embodiments of the present disclosure, the same reference numerals generally represent the same elements. In the accompanying drawings.

DETAILED DESCRIPTION

The principles of the present disclosure will be described below with reference to several example embodiments illustrated in the accompanying drawings. Although example embodiments of the present disclosure are illustrated in the accompanying drawings, it should be understood that these embodiments are described merely to enable those skilled in the art to better understand and then implement the present disclosure, and do not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may be included below.

As discussed above, it is difficult to train from a small number of samples, because true distribution characteristics of samples may not be summarized only from a small number of training samples, and then an accurate model cannot be trained.

Accordingly, the present disclosure provides a solution for analyzing samples. By acquiring feature representations associated with samples, feature data that can characterize original samples and has a lower dimension than that of original data is obtained. By adjusting the feature representations, the distribution in a feature space of feature representations of samples corresponding to the same classification is made more concentrated, thus making the distribution of feature representations corresponding to different classifications more easily distinguishable. By using the adjusted feature representations and classification information thereof to train a model, the trained model can be made more accurate, so that only a few samples can be used to complete the training of the model.

Example Environment

Figure 1:
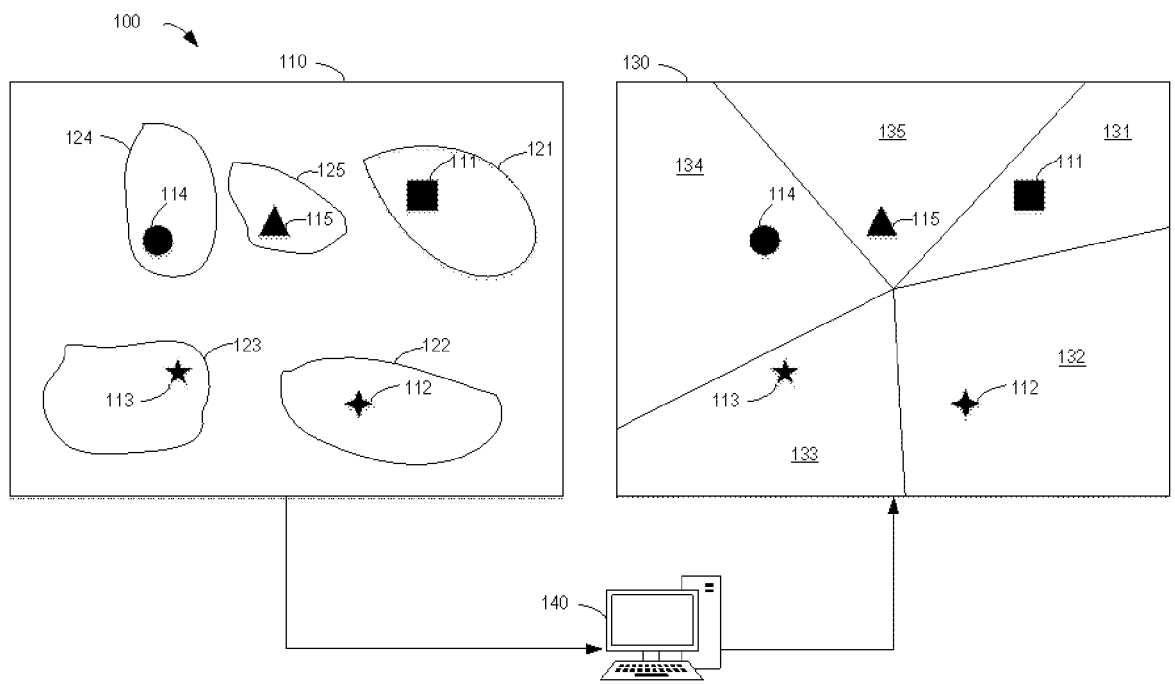
FIG. 1 illustrates a schematic diagram of an example environment in which embodiments of the present disclosure can be implemented.

FIG. 1 illustrates a schematic diagram of example environment 100 in which multiple embodiments of the present disclosure can be implemented. As shown in FIG. 1, environment 100 includes computing device 140, and computing device 140 may, for example, be a device with strong computing power, examples of which include but are not limited to: cloud-side servers, smart phones, laptops, tablets, desktops, edge computing devices, and so on.

According to embodiments of the present disclosure, computing device 140 can acquire a set of samples, and obtain feature representation space 110 of the samples via a feature extractor. The feature representation space 110 illustratively comprises first feature distribution 121 of feature representations 111 of samples corresponding to a first classification, second feature distribution 122 of feature representations 112 of samples corresponding to a second classification, third feature distribution 123 of feature representations 113 of samples corresponding to a third classification, fourth feature distribution 124 of feature representations 114 of samples corresponding to a fourth classification, and fifth feature distribution 125 of feature representations 115 of samples corresponding to a fifth classification. Computing device 140 uses properties possessed by the feature distributions of the feature representations to train a classifier. Classification space 130 corresponding to the trained classifier is illustrated in FIG. 1. Classification space 130 is divided, according to the feature distribution of the samples, into first classification region 131 to which the samples corresponding to the first classification belong, second classification region 132 to which the samples corresponding to the second classification belong, third classification region 133 to which the samples corresponding to the third classification belong, fourth classification region 134 to which the samples corresponding to the fourth classification belong, and fifth classification region 135 to which the samples corresponding to the fifth classification belong. Using the divided regions, it is possible to determine to which classification a sample corresponds to.

It should be understood that the classification and the number of specific samples shown in FIG. 1 is merely illustrative and is not intended to limit the present disclosure.

Example Method

Figure 2:
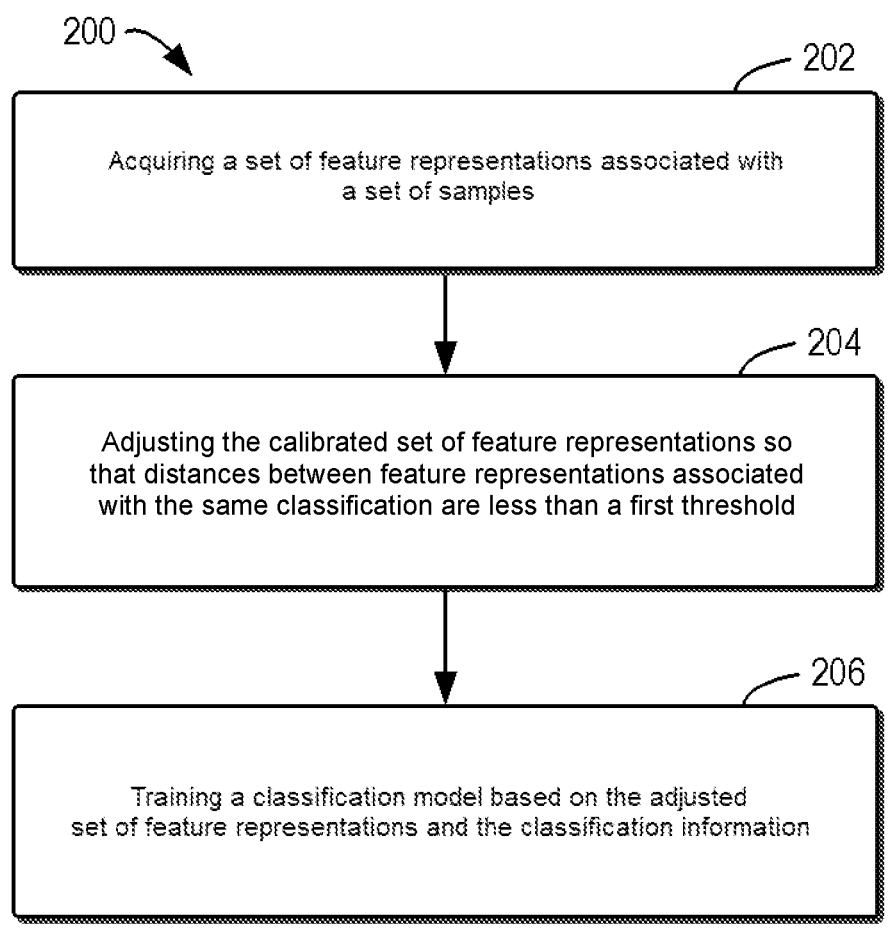
FIG. 2 illustrates a flow chart of an example method for analyzing samples according to embodiments of the present disclosure.

Example embodiments of the present disclosure will be described in detail below in combination with FIGS. 2 to 4. FIG. 2 illustrates a flow chart of example method 200 for analyzing samples according to embodiments of the present disclosure. Method 200 may be implemented, for example, by computing device 140 in FIG. 1.

At block 202, computing device 140 acquires a set of feature representations associated with a set of samples. Here, the set of samples have classification information for indicating classifications of the set of samples. For example, the classification information is classification labels given to the samples. For example, the set of samples may include samples with different classification labels, wherein the number of samples in each classification is small, with each classification in particular having no more than ten samples. In some embodiments, computing device 140 can process the set of samples using a feature extraction model, so as to determine the set of feature representations associated with the set of samples. The feature representations will be described below with reference to FIG. 3A.

Figure 3A:
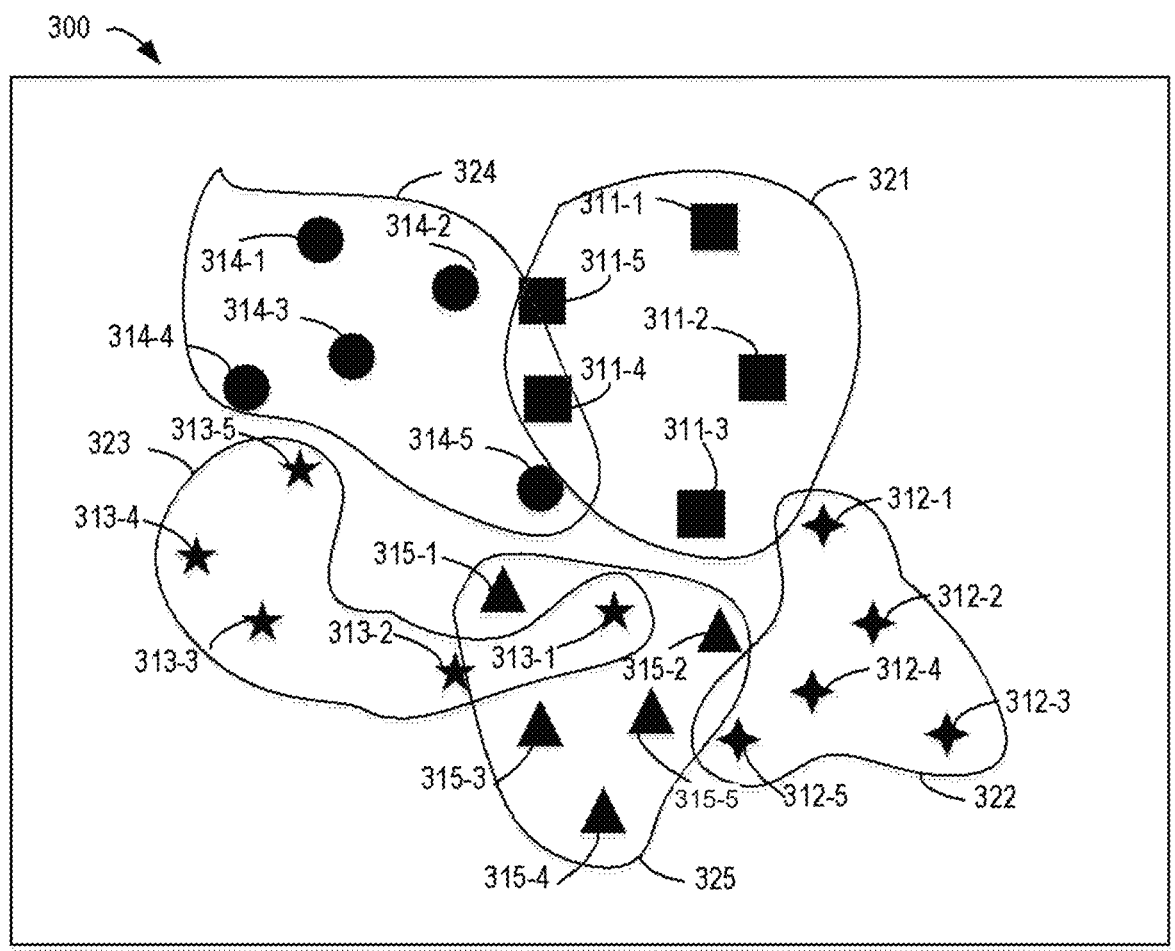
FIG. 3A illustrates a schematic diagram of an example distribution of feature representations according to some embodiments of the present disclosure.

FIG. 3A illustrates a schematic diagram of example distribution 300 of feature representations according to some embodiments of the present disclosure. As shown in FIG. 3A, samples corresponding to a first classification are represented by squares, i.e., sample 311-1, sample 311-2, sample 311-3, sample 311-4, and sample 311-5. The samples of the first classification are in first distribution 321 in the feature representation space. Samples corresponding to a second classification are represented by four-pointed stars, i.e., sample 312-1, sample 312-2, sample 312-3, sample 312-4, and sample 312-5. The samples of the second classification are in second distribution 322 in the feature representation space. Samples corresponding to a third classification are represented by five-pointed stars, i.e., sample 313-1, sample 313-2, sample 313-3, sample 313-4, and sample 313-5. The samples of the third classification are in third distribution 323 in the feature representation space. Samples corresponding to a fourth classification are represented as circles, i.e., sample 314-1, sample 314-2, sample 314-3, sample 314-4, and sample 314-5. The samples of the fourth classification are in fourth distribution 324 in the feature representation space. Samples corresponding to a fifth classification are represented as triangles, i.e., sample 315-1, sample 315-2, sample 315-3, sample 315-4, and sample 315-5. The samples of the fifth classification are in fifth distribution 325 in the feature representation space. In FIG. 3A, the distribution of feature representations is fitted by the positions of corresponding feature representations, and since the number of samples corresponding to one classification is small, the fitted feature representations may not fully reflect the true distribution. In addition, there are overlaps between first distribution 321 and fourth distribution 324 as well as second distribution 322, and between fifth distribution 325 and third distribution 323 as well as second distribution 322. This situation is also detrimental for training the classifier.

In some embodiments, computing device 140 can also calibrate the distribution of the set of feature representations so that the skewness of the distribution of the feature representations is less than a skewness threshold. In order to make the distribution of the feature representations more consistent with an expected distribution, the feature representations can be calibrated. For example, when the feature representations are expected to be more consistent with a Gaussian distribution, a Tukey power-order transformation can be used to calibrate the feature representations. The Tukey power-order transformation is as follows:

$$\hat{x} = \begin{cases} x^\lambda & \text{if } \lambda \neq 0 \\ \log(x) & \text{if } \lambda = 0 \end{cases} \quad (1)$$

where x is a feature representation, $\lambda$ is a hyper parameter and is set to 1, original features can be recovered, and when $\lambda$ is decreased, the forward skewness of the distribution decreases, and vice versa. The calibrated feature representations will be described below with reference to FIG. 3B.

Figure 3B:
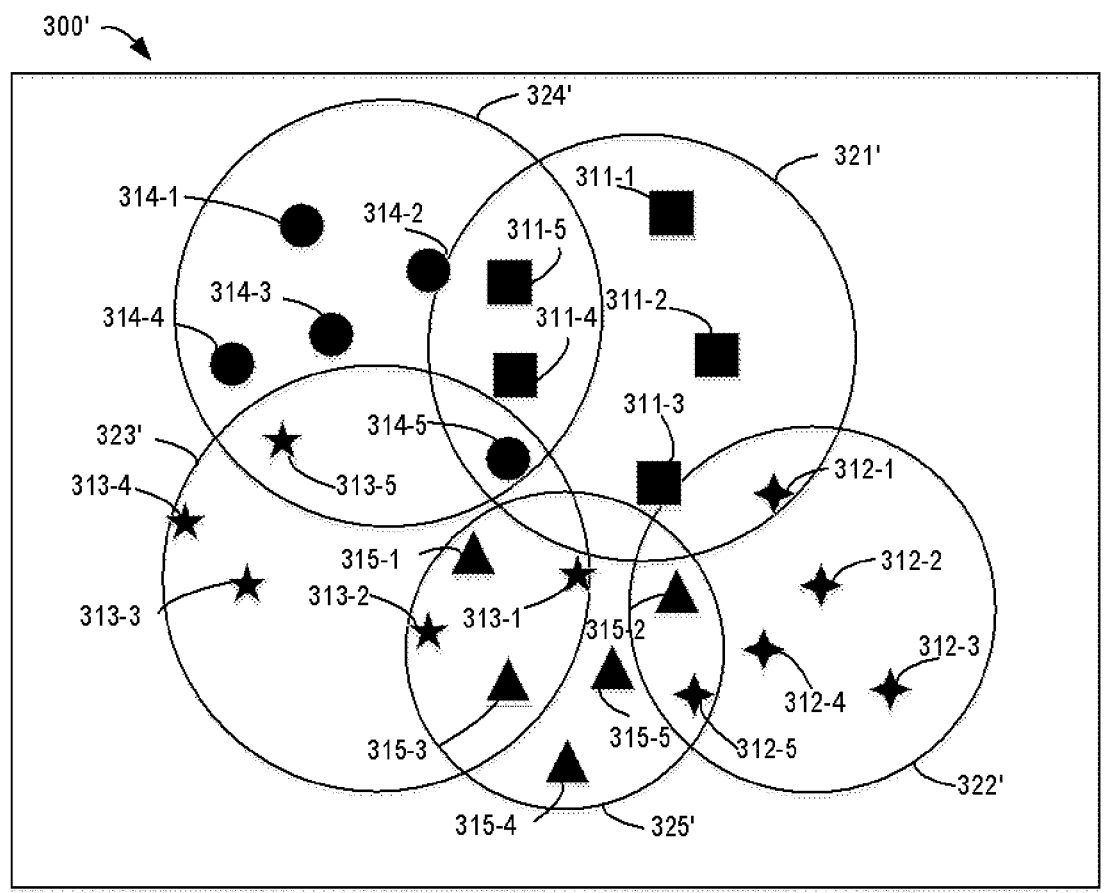
FIG. 3B illustrates a schematic diagram of a calibrated example distribution according to some embodiments of the present disclosure.

FIG. 3B illustrates a schematic diagram of example distribution 300' of feature representations according to some embodiments of the present disclosure. As shown in FIG. 3B, the difference from FIG. 3A lies in that the distributions of the calibrated feature representations in the feature space, i.e., calibrated first classification 321' corresponding to the first classification, calibrated second classification 322' corresponding to the second classification, calibrated third classification 323' corresponding to the third classification, calibrated fourth classification 324' corresponding to the fourth classification, and calibrated fifth classification 325' corresponding to the fifth classification, are all in the same form. For example, the feature distribution becomes a Gaussian distribution after the feature representations have undergone the Tukey power-order transformation.

In this manner, by calibrating the distribution of the feature representations, it is possible to make the feature representations of samples corresponding to the same classification conform to a particular distribution form to eliminate uncertainty of the initial feature distribution, thereby improving the accuracy of subsequent processing. It should be understood that the calibration approach discussed here is only an example, the distribution to be achieved after calibration can also be of other types, and the specific implementation of calibration can be determined based on the desired type of distribution.

Referring again to FIG. 2, at block 204, computing device 140 adjusts the calibrated set of feature representations so that distances between feature representations associated with the same classification are less than a first distance threshold, which is illustratively a predetermined threshold. In this manner, feature representations belonging to the same classification can be made as concentrated as possible. In some embodiments, computing device 140 can adjust the set of feature representations while making distances between feature representations of samples corresponding to different classifications greater than a second distance threshold. In this manner, feature representations belonging to different classifications can be separated by a certain distance, thus avoiding the overlapping of feature distributions of two different classifications. In some embodiments, computing device 140 can acquire an adjustment matrix by minimizing a loss function. For example, the loss function is based on a feature distance between a pair of feature representations in the set of feature representations and a distance parameter associated with the feature distance. Afterwards, computing device 140 can adjust the set of feature representations based on the determined adjustment matrix.

In some embodiments, the loss function is a function that characterizes the energy associated with a distance between two samples as follows:

$$L = \sum_i^N \sum_j^{N-1} \left[ \frac{1}{(d_{ij} + \lambda)^2} - \frac{1}{(d_{ij} + \lambda)^3} \right] \quad (2)$$

where $d_{ij}$=dis($W_T f_i$, $W_T f_j$), dis( ) denotes a measure of the feature distance between feature representation $f_i$ and feature representation $f_j$, such as a Euclidean distance in a Euclidean space, N is the number of samples, while $\lambda$ is the distance parameter of feature distance $d_{ij}$, $\lambda$ is a hyper parameter that can be set, and $W_T$ is the adjustment matrix. The adjustment matrix $W_T$ can be determined, for example, by performing back propagation calculations on the loss function L.

In some embodiments, if the feature distance is a distance between feature representations associated with different classifications, computing device 140 can set the distance parameter to be relatively small. In contrast, if the feature distance is a distance between feature representations associated with the same classification, computing device 140 can set the distance parameter to be relatively large. With reference to the loss function (2), for example, when calculating a feature distance $d_{ij}$ between two feature representations $f_i$ and $f_j$ that belong to the same classification, the distance parameter $\lambda$ can be set to 1, for example. When calculating a feature distance $d_{ij}$ between two feature representations $f_i$ and $f_j$ that belong to different classifications, the distance parameter $\lambda$ can be set to 0, for example. In this manner, by setting the distance parameter in a targeted manner, it is possible to make samples corresponding to the same classification to be relatively concentrated and make samples corresponding to different classifications to be relatively dispersed. The distribution of the adjusted feature representations is described below with reference to FIG. 3C.

Figure 3C:
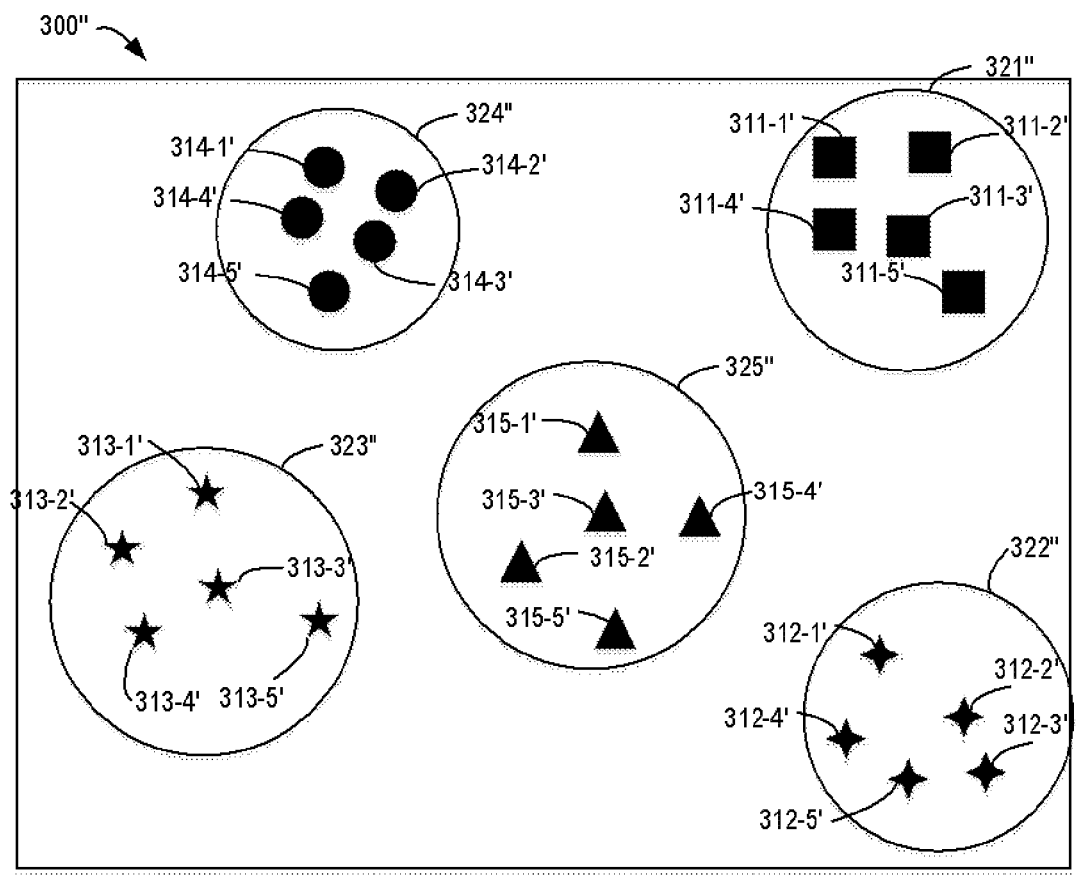
FIG. 3C illustrates a schematic diagram of an adjusted example distribution according to some embodiments of the present disclosure.

FIG. 3C illustrates a schematic diagram of example distribution 300" of adjusted feature representations according to some embodiments of the present disclosure. As shown in FIG. 3C, after adjustment, sample 311-1', sample 311-2', sample 311-3', sample 311-4', and sample 311-5' corresponding to the first classification are all adjusted to the upper right of the feature space and have first feature distribution 321". Sample 312-1', sample 312-2', sample 312-3', sample 312-4', and sample 312-5' corresponding to the second classification are all adjusted to the lower right of the feature space and have second feature distribution 322". Sample 313-1', sample 313-2', sample 313-3', sample 313-4', and sample 313-5' corresponding to the third classification are all adjusted to the lower left of the feature space and have third feature distribution 323". Sample 314-1', sample 314-2', sample 314-3', sample 314-4', and sample 314-5' corresponding to the fourth classification are all adjusted to the upper left of the feature space and have fourth feature distribution 324". Sample 315-1', sample 315-2', sample 315-3', sample 315-4', and sample 315-5' corresponding to the fifth classification are all adjusted to the middle of the feature space and have fifth feature distribution 325". As shown in FIG. 3C, the feature representations of samples corresponding to the same classification are relatively concentrated and all have the same specific distribution, while the feature representations of samples corresponding to different classifications are relatively scattered and do not overlap.

Referring again to FIG. 2, at block 206, computing device 140 trains a classification model based on the adjusted set of feature representations and the classification information. The classification model is configured to receive an input sample and determine a classification of the input sample. For example, the trained classification model is a logistic regression classifier. It should be understood that any known type of classifier can be trained using the adjusted feature representations as well as the classification information of the present disclosure.

In this manner, by adjusting feature representations associated with samples, a particularly small number of feature representations can be made to more accurately reflect the types of classifications to which they belong, thereby improving the accuracy of the trained model and substantially reducing the time and computation performance required for training.

It should be understood that the samples discussed in the present disclosure may be images, video, audio, text, and the like.

Figure 4:
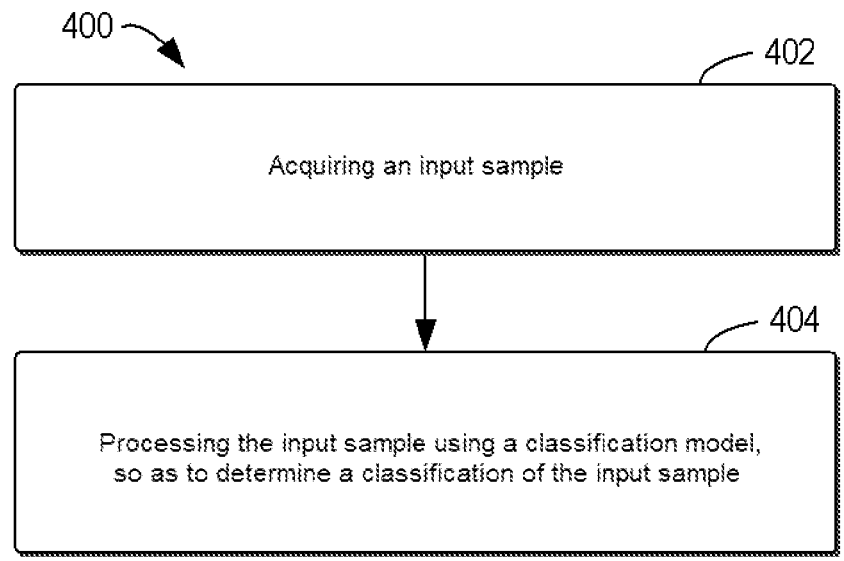
FIG. 4 illustrates a flow chart of an example method for classifying samples according to embodiments of the present disclosure.

FIG. 4 illustrates a flow chart of example method 400 for classifying samples according to embodiments of the present disclosure. Method 400 can be implemented, for example, by an appropriate computing device, and it should be understood that method 400 can be performed by a computing device that is the same as, or different from, computing device 140 used to perform method 200. For ease of description, method 400 will be described below using computing device 140 as an example.

As shown in FIG. 4, at block 402, computing device 140 acquires an input sample.

At block 404, computing device 140 processes the input sample using a classification model, so as to determine a classification of the input sample. Here, the classification model is trained based on the method for analyzing samples, such as method 200, of the first aspect of the present disclosure. It should be understood that the various embodiments associated with method 200 and the related discussion and advantages are all appropriate for method 400.

Example Device

Figure 5:
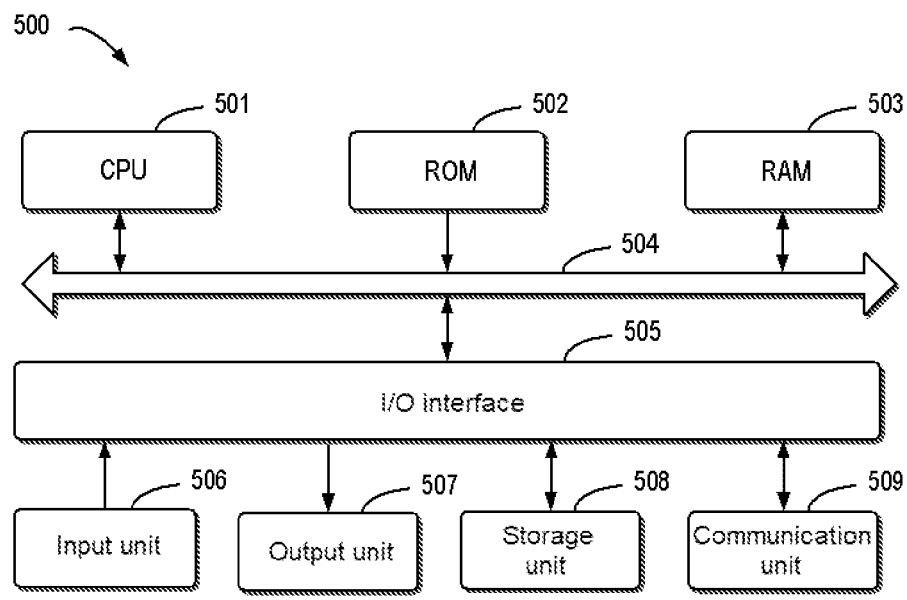
FIG. 5 illustrates a block diagram of an example device that can be used to implement embodiments of the present disclosure.

FIG. 5 illustrates a schematic block diagram of example device 500 that can be used to implement embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet and/or various telecommunication networks.

The various processes and processing described above, such as method 200 and method 400, may be performed by CPU 501. For example, in some embodiments, method 200 and method 400 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded to RAM 503 and executed by CPU 501, one or more actions of methods 200 and 400 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for analyzing samples, including:

acquiring, in a processor-based machine learning system, a set of feature representations associated with a set of samples, wherein the set of samples have classification information for indicating classifications of the set of samples;

adjusting, in the processor-based machine learning system, the set of feature representations so that distances between feature representations of samples corresponding to the same classification are less than a first distance threshold, wherein the adjusting comprises obtaining an adjustment matrix based on a loss function, the loss function comprising a function that iteratively processes distances between respective pairs of feature representations of the samples, wherein the function that iteratively processes the distances between the respective pairs of feature representations comprises, for a given such iteration, at least a difference between an inverse-squared function of the distance and an inverse-cubed function of the distance, and wherein the adjusting is performed at least in part utilizing the obtained adjustment matrix; and training, in the processor-based machine learning system, a classification model based on the adjusted set of feature representations and the classification information, wherein the classification model is configured to receive an input sample and determine a classification of the input sample from among a plurality of classifications each associated with a different calibrated feature distribution of a respective corresponding portion of the set of samples, the adjusted set of feature representations and classification information utilized to train the classification model providing increased concentrations of samples associated with respective same classifications, thereby making different ones of the feature representations corresponding to respective different classifications more easily distinguishable from one another, and reducing a number of samples needed to achieve a given level of accuracy of the trained classification model relative to a number of samples that would otherwise be needed absent the adjusting.

2. The method according to claim 1, wherein acquiring a set of feature representations associated with a set of samples includes:
   processing the set of samples using a feature extraction model, so as to determine a set of initial feature representations associated with the set of samples;
   calibrating a distribution of the set of initial feature representations so that a skewness of the distribution of feature representations is less than a skewness threshold; and
   determining the set of feature representations associated with the set of samples based on the calibrated set of initial feature representations.

3. The method according to claim 1, wherein adjusting the set of feature representations includes:
   adjusting the set of feature representations so that distances between feature representations of samples corresponding to different classifications are greater than a second distance threshold.

4. The method according to claim 3, wherein adjusting the set of feature representations includes:
   determining the adjustment matrix by minimizing the loss function, wherein the loss function is based on the following: a feature distance between a pair of feature representations in the set of feature representations, and a distance parameter associated with the feature distance; and
   adjusting the set of feature representations based on the adjustment matrix.

5. The method according to claim 4, wherein the distance parameter is determined based on whether the pair of feature representations have the same classification.

6. The method according to claim 1, further including:
   acquiring the input sample; and
   processing the input sample using the classification model, so as to determine the classification of the input sample.

7. The method according to claim 1, wherein at least one of the inverse-squared function of the distance and the inverse-cubed function of the distance comprises a configurable hyper parameter, wherein the hyper parameter has a first value if the feature representations of a given one of the pairs each have a same classification and has a second value different than the first value if the feature representations of the given pair have respective different classifications.

8. An electronic device, including:
   at least one processor; and
   memory coupled to the at least one processor, the memory having instructions stored therein that, when executed by the at least one processor, cause the electronic device to execute actions including:
   acquiring, in a processor-based machine learning system, a set of feature representations associated with a set of samples, wherein the set of samples have classification information for indicating classifications of the set of samples;
   adjusting, in the processor-based machine learning system, the set of feature representations so that distances between feature representations of samples corresponding to the same classification are less than a first distance threshold, wherein the adjusting comprises obtaining an adjustment matrix based on a loss function, the loss function comprising a function that iteratively processes distances between respective pairs of feature representations of the samples, wherein the function that iteratively processes the distances between the respective pairs of feature representations comprises, for a given such iteration, at least a difference between an inverse-squared function of the distance and an inverse-cubed function of the distance, and wherein the adjusting is performed at least in part utilizing the obtained adjustment matrix; and
   training, in the processor-based machine learning system, a classification model based on the adjusted set of feature representations and the classification information, wherein the classification model is configured to receive an input sample and determine a classification of the input sample from among a plurality of classifications each associated with a different calibrated feature distribution of a respective corresponding portion of the set of samples, the adjusted set of feature representations and classification information utilized to train the classification model providing increased concentrations of samples associated with respective same classifications, thereby making different ones of the feature representations corresponding to respective different classifications more easily distinguishable from one another, and reducing a number of samples needed to achieve a given level of accuracy of the trained classification model relative to a number of samples that would otherwise be needed absent the adjusting.

9. The electronic device according to claim 8, wherein acquiring a set of feature representations associated with a set of samples includes:
   processing the set of samples using a feature extraction model, so as to determine a set of initial feature representations associated with the set of samples;
   calibrating a distribution of the set of initial feature representations so that a skewness of the distribution of feature representations is less than a skewness threshold; and
   determining the set of feature representations associated with the set of samples based on the calibrated set of initial feature representations.

10. The electronic device according to claim 8, wherein adjusting the set of feature representations includes:
    adjusting the set of feature representations so that distances between feature representations of samples corresponding to different classifications are greater than a second distance threshold.

11. The electronic device according to claim 10, wherein adjusting the set of feature representations includes:
    determining the adjustment matrix by minimizing the loss function, wherein the loss function is based on the following: a feature distance between a pair of feature representations in the set of feature representations, and a distance parameter associated with the feature distance; and
    adjusting the set of feature representations based on the adjustment matrix.

12. The electronic device according to claim 11, wherein the distance parameter is determined based on whether the pair of feature representations have the same classification.

13. The electronic device according to claim 8, wherein the actions further include:
    acquiring the input sample; and
    processing the input sample using the classification model, so as to determine the classification of the input sample.

14. A computer program product comprising a non-transitory computer-readable storage medium storing machine-executable instructions, wherein the machine-executable instructions, when executed, cause a machine to perform a method for analyzing samples, the method including:
- acquiring, in a processor-based machine learning system, a set of feature representations associated with a set of samples, wherein the set of samples have classification information for indicating classifications of the set of samples;
- adjusting, in the processor-based machine learning system, the set of feature representations so that distances between feature representations of samples corresponding to the same classification are less than a first distance threshold, wherein the adjusting comprises obtaining an adjustment matrix based on a loss function, the loss function comprising a function that iteratively processes distances between respective pairs of feature representations of the samples, wherein the function that iteratively processes the distances between the respective pairs of feature representations comprises, for a given such iteration, at least a difference between an inverse-squared function of the distance and an inverse-cubed function of the distance, and wherein the adjusting is performed at least in part utilizing the obtained adjustment matrix; and
- training, in the processor-based machine learning system, a classification model based on the adjusted set of feature representations and the classification information, wherein the classification model is configured to receive an input sample and determine a classification of the input sample from among a plurality of classifications each associated with a different calibrated feature distribution of a respective corresponding portion of the set of samples, the adjusted set of feature representations and classification information utilized to train the classification model providing increased concentrations of samples associated with respective same classifications, thereby making different ones of the feature representations corresponding to respective different classifications more easily distinguishable from one another, and reducing a number of samples needed to achieve a given level of accuracy of the trained classification model relative to a number of samples that would otherwise be needed absent the adjusting.

15. The computer program product according to claim 14, wherein acquiring a set of feature representations associated with a set of samples includes:
- processing the set of samples using a feature extraction model, so as to determine a set of initial feature representations associated with the set of samples;
- calibrating a distribution of the set of initial feature representations so that a skewness of the distribution of feature representations is less than a skewness threshold; and
- determining the set of feature representations associated with the set of samples based on the calibrated set of initial feature representations.

16. The computer program product according to claim 14, wherein adjusting the set of feature representations includes:
- adjusting the set of feature representations so that distances between feature representations of samples corresponding to different classifications are greater than a second distance threshold.

17. The computer program product according to claim 16, wherein adjusting the set of feature representations includes:
- determining the adjustment matrix by minimizing the loss function, wherein the loss function is based on the following: a feature distance between a pair of feature representations in the set of feature representations, and a distance parameter associated with the feature distance; and
- adjusting the set of feature representations based on the adjustment matrix.

18. The computer program product according to claim 17, wherein the distance parameter is determined based on whether the pair of feature representations have the same classification.

19. The computer program product according to claim 14, wherein the method further includes:
- acquiring the input sample; and
- processing the input sample using the classification model, so as to determine the classification of the input sample.

* * * * *